United States Patent [19]

Eberhardt

[11] 4,143,577
[45] Mar. 13, 1979

[54] ANCHOR BASE FASTENER

[75] Inventor: Robert M. Eberhardt, Park Ridge, Ill.

[73] Assignee: All States Plastic Manufacturing Co., Inc., Chicago, Ill.

[21] Appl. No.: 781,633

[22] Filed: Mar. 28, 1977

[51] Int. Cl.² ............................................. F16B 19/00
[52] U.S. Cl. ...................................... 85/5 R; 24/73 P; 174/138 D; 248/71
[58] Field of Search .................. 85/5 R, 80, 8.3, 1.5 R; 24/73 P, 73 PF, 73 HS; 248/71, 74; 174/138 D

[56] References Cited

U.S. PATENT DOCUMENTS

| | | | |
|---|---|---|---|
| 1,603,003 | 10/1926 | Ennis | 85/32 R X |
| 3,130,822 | 4/1964 | Meyer | 24/73 PM X |
| 3,529,795 | 9/1970 | Van Niel | 248/71 |
| 3,777,052 | 12/1973 | Fegen | 85/5 R X |
| 3,905,570 | 9/1975 | Nieuwveld | 85/5 R X |
| 3,909,883 | 10/1975 | Fegen | 85/5 R X |

Primary Examiner—Ramon S. Britts
Attorney, Agent, or Firm—Charles A. Laff; J. Warren Whitesel; Howard B. Rockman

[57] ABSTRACT

An anchor base for integral plastic structures includes an articulated series of lever arms joined together in at least one joint by means of a living hinge in order to establish a preferred point of articulation. The leverage is such that, as a first pair of the lever arms are squeezed together to insert them into a mounting hole in a chassis, a second pair of lever arms, for giving lateral support, are initially pulled down. As the anchor base penetrates the mounting hole, the entire lever system pivots while lateral support levers are pushed up to spread the first pair of arms. Shoulders on the first pair of arms are forced under the lower side of the chassis, in order to capture the anchor base and to resist its removal. If the first pair of arms are thereafter squeezed together below the underside of the chassis, it is easy to remove the anchor base.

15 Claims, 7 Drawing Figures

ANCHOR BASE FASTENER

This invention relates to fasteners and more particularly to anchor bases, integral with all plastic connectors.

Currently, plastic connectors have many uses and their further utilization on new products is expanding rapidly. A few of such products currently being used in the electronics industry are: stand-off clips and connectors for supporting printed circuit cards and other components, cable ties for harnessing wiring, component supports, wire hangers, saddles and mounts for guiding and directing wires as they are strung, cable clamps, and spacers. There are also many other and somewhat similar devices used outside the electronics industries. For example, the automotive industry uses plastic hose clamps, body trim mounts and the like, all of which may use anchor bases.

Regardless of the types of connectors or the reasons why they are used, there is a need for new and improved anchor bases to secure them to supporting chassis, frames, or other structures. Typically, an anchor base includes an end, which may be pushed through a hole in a mounting structure. Barbs or other geometric shapes on the anchor base are designed so that they may be pushed through but not pulled out of a mounting hole, in order to secure it when it is in place.

A desirable anchor base is a device which may be easily pushed into the mounting hole, without requiring an undue amount of force. The anchor base should be very difficult to accidentally pull from the mounting hole. However, when it is desirable to deliberately remove the base, it should be very easy to dislodge and remove it.

Heretofore, these features have placed conflicting demands upon the anchor base. If it is sturdy enough to resist forces tending to pull it out of the mounting hole, it also requires too much force to push it into the mounting hole. If the fastener is used on a chassis having a wide range of different thicknesses, it either fails to give adequate stability on material which is overly thin or is too hard to insert on material which is overly thick.

Accordingly, an object of the invention is to provide new and improved anchor bases. Here, an object is to provide an anchor base which is easy to insert into a mounting hole and yet is very difficult to remove therefrom. In this connection, an object is to provide a system of articulated lever arms which are self-deploying, especially when it is driven into a locking position.

Yet another object of the invention is to provide an anchor base which is suitable for a great variety of different devices, such as stand-off connectors, cable ties, and the like.

In keeping with the invention, these and other objects are accomplished by an integral plastic anchor base having an articulated series of lever arms, joined together at a preferred point or points of articulation by one or more living hinges. The leverage is such that, as a pair of the lever arms are squeezed together when they are inserted into a mounting hole, a pair of lateral support lever members are pulled down. As the anchor base penetrates the mounting hole, these lateral support lever members are pushed upwardly to spread the arms. In the spreading process, a pair of locking shoulders are forced under the chassis material containing the mounting hole, in order to capture the base and resist removal of the anchor base.

A preferred embodiment of the inventive anchor base may be understood from the attached drawing, wherein:

FIGS. 1 and 5–7 are presented to illustrate an exemplary few of the many uses for the inventive anchor base.

Figure 1:
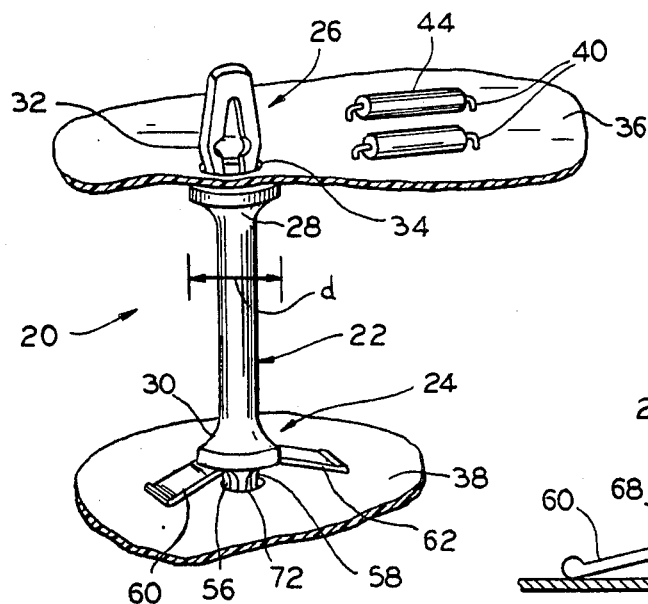
FIG. 1 is a perspective view of a stand-off connector which exemplifies a use of the invention.

In FIG. 1, there is a plastic stand-off connector 20 comprising a column 22 having an anchor base 24 at one end and a printed circuit card connector 26 at the other end. The column 22 has a flared or mushroom top section 28 and bottom section 30. Each flared section gradually spreads from the relatively narrow diameter of the column 22 to the relatively wide diameter of the base. Such a column has the effective supporting diameter d of the wide base. This flared section results in a substantial savings of plastic, at no reduction in vertical load bearing strength.

The upper connector 26 is a somewhat diamond-shaped member having relatively wide shoulders 32 which may be squeezed together when pressed through a hole 34 formed in a conventional printed circuit board 36. Once the wide shoulders 32 pass through the hole 34, they spring back to their original wide dimension configuration owing to memory of the plastic. When in such original configuration, it is not easy to remove the printed circuit board from the standoff connector.

The purpose of the stand-off connector 20 is to hold the printed circuit board 36 away from an underlying chassis surface 38 to insure against a short circuiting of the leads 40 of components 44, which are mounted on the board.

Figure 2:
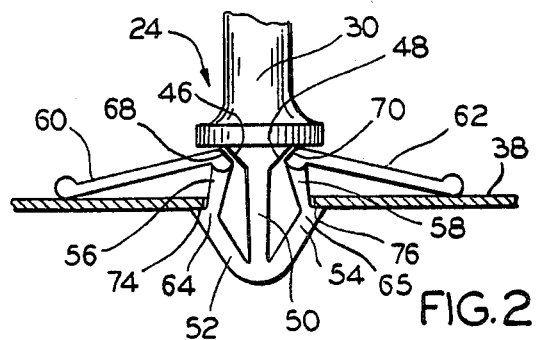
FIG. 2 is an elevation view of the inventive anchor base inserted in a mounting hole in the chassis.

The details of the inventive anchor base 24 are seen in FIG. 2. Depending from the flared base 30 are a pair of cam surfaces 46, 48 which are inclined downwardly and tend to have an appearance of an inverted, truncated triangle. For easy identification, the cam surfaces 46, 48 are drawn in heavily inked lines.

Projecting beyond the cam surfaces 46, 48 is a central spar 50 which extends outwardly and terminates in a pair of actuator arms 52, 54 generally oriented in an apex or arrowhead configuration. Dependent from each of the arrow configured actuator arms 52, 54 is an operating arm 56, 58 extending to opposed lateral support arms 60, 62. The arms 52, 54, 56, 58 have a generally diamond-shaped configuration.

The cross-sectional dimensions of the arms are relatively large to form fairly rigid levers. The arms 52, 56 and 54, 58 are joined together by relatively more flexible sections in order to form a living hinge at each of the junctions 64, 65 of these lever arms (i.e., at the shoulders of the diamond shape). Thus, for example, lever arm 56 is pivotally connected to lever arm 52 by a living hinge at point 64. The junctions between arms 60, 56 and 62, 58 are relatively rigid.

Each of the lateral support arms 60, 62 has an inclined bearing surface, 68, 70, which is positioned to lever against a bearing surface formed by the cam surfaces 46, 48. For easy identification, the bearing surfaces 68, 70 are also drawn in heavily inked lines.

It should be noted that the arms 52, 54 are not joined to the central spar by any hinge section. Therefore, they resist bending, without being so stiff that they cannot be pushed through a mounting hole in a chassis. The memory of the plastic tends to urge the arms 52, 54 back into their normal arrowhead configuration as shown in FIG. 2, after they have passed through a mounting hole. Therefore, as shown in FIG. 1, the anchor base 24 may be mounted on any suitable surface, such as chassis 38, by simply pushing it through a mounting hole 72 formed therein.

Figure 3:
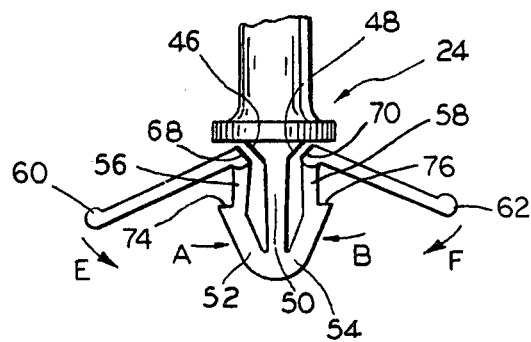
FIG. 3 is a similar elevation view showing the base immediately before an articulation of the same anchor base during its initial insertion, into a mounting hole, wherein the articulated lever arms will be squeezed together.
Figure 4:
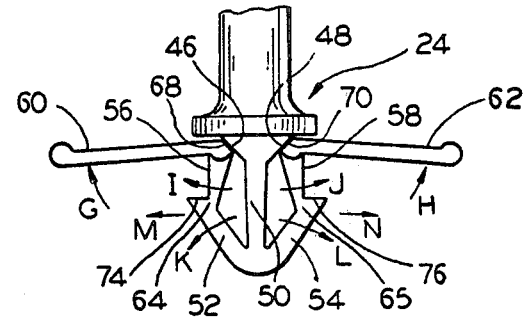
FIG. 4 is a similar elevation view of the same anchor base when the articulated arms have been driven into a captive position.

The operation of the inventive lever action is shown in FIGS. 3 and 4. When the actuator arms 52, 54 are pressed against the circumferential shoulder of the mounting hole 72, forces A, B (FIG. 3) act upon the arms 52, 54 and force them to move inwardly toward the central spar 50. The bearing surfaces 68, 70 come to rest upon the cam surfaces 46, 48 to stabilize the ends of operating arms 56, 58. The lateral stabilizing arms 60, 62 swing in directions E, F, respectively, responsive to the forces A, B applied by the circumferential shoulder of the mounting hole 72 as the arms actuator 52, 54 squeeze through it.

When the tips of the lateral support arms 60, 62 reach the top of the chassis 38, they are pushed upwardly in directions G, H (FIG. 4) with the bearing surfaces 68, 70 resting against the cam surfaces 46, 48. In these positions, operating arms 56, 58 are swung in directions I, J. This causes the hinge elements 64, 65 to pivot and both force and enable the plastic memory to move the upper ends of actuator arms 52, 54 to swing outwardly in directions K, L. This combination of forces I, J, K, and L causes the shoulder ends 74, 76 of the arms 52, 54 to move outwardly in directions M, N, where they are forced under the lower surface of the chassis 38 (as seen in FIG. 2).

Briefly, in review, on insertion, the actuator arms 52, 54 flex inwardly, without any initial resistance other than plastic memory. Thus, the anchor base 24 may be pushed into a mounting hole in the chassis with little force required. Once the shoulders 74, 76 on arms 52, 54 clear the underside of the hole, they are driven outwardly in directions M, N by the joint forces of the lateral stabilization arms 60, 62 and of the memory in the plastic forming actuator arms 52, 54. Once the shoulders 74, 76 are forced under the lower side of the chassis 38, the anchor base 24 cannot be pulled out of the mounting hole under any normally expected forces.

If it should become necessary or desirable to deliberately remove the anchor base, the arms 52, 54 may be pushed together, in directions A, B. The shoulders 74, 76 clear the mounting hole, and the anchor base 24 may be pulled free of the mounting hole simply and easily.

While the foregoing disclosure has been primarily directed to the stand-off connector of FIG. 1, the invention is not limited thereto. Quite the contrary, the invention may be used anytime that it is necessary or desirable to anchor a device in a mounting hole on a chassis, frame, or the like. For example, the clamp 77 of FIG. 5 may be used to secure an electronic component onto a chassis. The anchor base 24 of FIG. 5 may be pushed through a mounting hole such as 72 (FIG. 1). Then, any generally cylindrical object may be pushed into the circular space 79 embraced by the arms 80, 82, integrally attached to anchor base 24 of FIG. 5.

Figure 6:
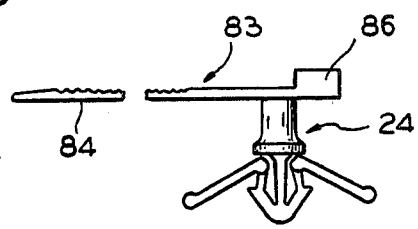
FIG. 6 is an elevation view of the anchor base, integral with a cable tie device.

FIG. 6 shows another exemplary device using the inventive anchor base. A cable tie 83 comprises a strap 84 having a rack of upstanding teeth formed transversely thereon. At the opposite end of strap 84 is a clamping head 86 which contains a toothed pawl (not seen in FIG. 6) for taking a bite upon the rack on strap 84. Thus, the strap 84 may be wrapped around a bundle of wires, threaded through head 86, pulled tightly, and held in place by the pawl. Then, the cable tie may be mounted by pushing the anchor base 24 of FIG. 6 through a mounting hole in the chassis.

Figure 7:
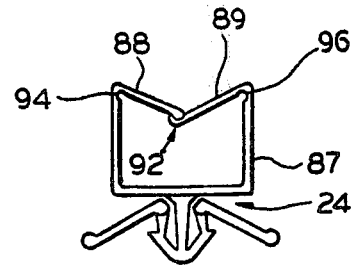
FIG. 7 is an elevation view of the anchor base, integral with a wire saddle clamp.

FIG. 7 shows another exemplary use of the anchor base 24. An upstanding frame 87, on the anchor base 24, includes a pair of arms 88, 89 having interlocking ends 92, pivoted on living hinges 94, 96. Thus, a wire may be pressed against the interlocking ends 92, arms 88, 89 swing to an open position and spring back to the closed position.

In one embodiment actually built and tested the inventive anchor base displayed startling improved characteristics. The entrance force required to insert, for commonly used chassis thicknesses, the anchor base through a mounting hole was reduced to approximately ⅓ of the force require to insert the next best currently available device. The force required to extract the anchor base, after it has been inserted, was substantially the same as the force required to extract the next best prior art device. In operation, the inventive device performed completely satisfactorily, according to test procedures which are conventionally run by my assignee.

Figure 5:
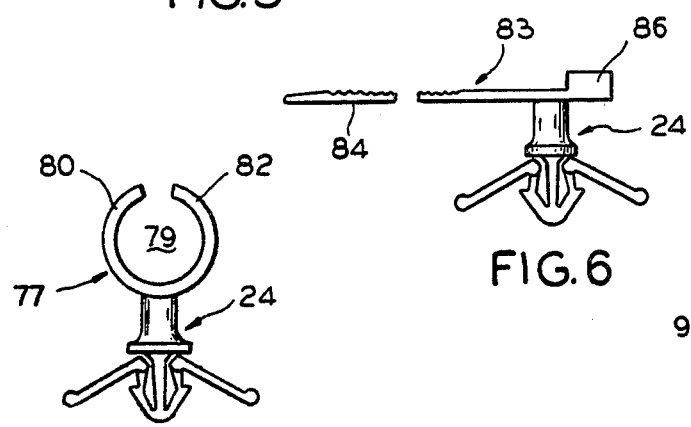
FIG. 5 is an elevation view of the anchor base, integral with a component mounting device.

The examples of FIGS. 5–7 are only a few of many which could be cited to illustrate the broad usage of the inventive anchor base. Also, those who are skilled in the art will readily perceive how various modifications may be made without departing from the scope and the spirit of the invention. Therefore, the appended claims are to be construed broadly enought to cover all equivalent structures.

I claim:

1. An anchor base for a one-piece plastic device comprising a base having two separate series of interconnected and mutually articulated lever arms formed thereon, each of said two separate series of said lever arms comprising actuator, operating, and lateral supporting arms, joined at one end to a central spar extending from at least a pair of bearing cam surfaces inclined from said base toward said central spar, each of said series of arms including said actuator arm integral at said one end with and depending angularly from the end of said spar to form a generally arrowhead configuration, said operating arm dependent from the other end of said actuator arm and joined thereto at an obtuse angle to form in conjunction with the operating and actuator arms of the other series a generally diamond-shaped configuration, and said lateral support lever arm being joined to an opposite end of said operating arm, said lateral support lever arm extending away from the operating arm to form an acute angle therewith, the end of said lateral support arm nearest said central spar having a bearing surface which is completely separate from but works against a bearing formed by said bearing cam surfaces in order to articulate said series of lever arms.

2. The anchor base of claim 1 and outwardly extending shoulders formed near the corners of said diamond shape, said shoulders being driven laterally outward from said spar responsive to an articulation of said lateral support arms with said bearing surfaces resting on said bearing cam surfaces.

3. The anchor base of claim 1 and hinge means integrally formed between each junction of said actuator arm and said operating arm.

4. The anchor base of claim 1 wherein said base comprises a column having a section flaring outwardly from a relatively narrow diameter portion of said column to a relatively wide diameter base of said column, said central spar extending away from the wide diameter base.

5. The anchor base of claim 4 wherein said relatively narrow portion of said column extends to an opposite end where it forms second section flaring from said narrow diameter portion of said column to a relatively wide diameter, and connector means attached to said second section.

6. The anchor base of claim 1 wherein each of said actuator arms terminates in outwardly extending shoulders which are formed at the corners of said generally diamond-shaped hinged configuration, flexing means integrally formed in each junction between an actuator arm and an operating arm to form a preferred point of flexing, said shoulders being driven laterally outward from said spar responsive to an articulation of said lateral support arms with said bearing surfaces resting on and working against said cam surfaces, said base comprising a column having a first section flaring outwardly from a relatively narrow diameter portion of said column to a relatively wide diameter base, said relatively narrow portion of said column extending to an opposite end where it forms a second section flaring from said narrow diameter portion of said column to a relatively wide diameter, and connector means attached to said second section.

7. A one-piece plastic structure comprising an anchor base of a pair of separate but interconnected and articulated series of lever arms individual sections of said series defining a generally arrow-shaped configuration, relatively rigid means for supporting the tip of said arrow shape, said tip forming means for guiding and directing a tip end of said anchor base into a mounting hole, said individual sections of each of said lever arms being a relatively rigid bar like member, shoulder means on said articulated arms located at a point which is between said anchor base and the tip of said arrow-shaped configuration, said shoulder means locking said anchor base into said mounting hole responsive to an articulation of said lever arms, an elongated articulating member at the extremity of said series which is remote from said supporting means, and means located at a point between said shoulder and said anchor base means for supporting said articulating member and thereby enabling an articulation of said interconnected series of lever arms in order to drive said shoulder means laterally into a locking position.

8. The structure of claim 7 and cam means formed on said base, said articulating means resting on and working against said cam surface in a position to engage material which surrounds said mounting hole when said arrow-shaped means is pressed into said mounting hole, and said articulating means driving said shoulder into said locking position responsive to continued motion of said tip out of said mounting hole.

9. The structure of claim 8 and column means on the side of said anchor base which is opposite said arrow-shaped means, said column having a section which flares from a relatively small diameter to a relative wide diameter at said base.

10. The structure of claim 9 and mounting means on the end of said column which is opposite to said flaring section.

11. The structure of claim 10 wherein said mounting means on said opposite end is a printed circuit card connector.

12. The structure of claim 11 wherein said mounting means on said opposite end is a cable tie.

13. The structure of claim 11 wherein said mounting means on said opposite end is a component mounting structure.

14. A one-piece plastic anchor base comprising a plurality of articulated levers, at least one first pair of said levers being joined together at one of their ends by a relatively rigid coupling and angularly connected to said base at the end of a relatively rigid spar whereby the memory of said plastic always urges said levers to a predetermined position, at least one second pair of said levers each having one end flexibly and angularly joined to the other end of said first pair whereby the natural preference of said first and second pairs of levers is to articulate at said flexible joint and at least one third pair of said levers rigidly attached at an acute angle to the other end of said second pair, said three pair of lever arms forming two series of lever arms proportioned to cause articulation of said two series of levers responsive to a mounting of said anchor base, said third pair of lever arms forming an elongated member for actuating said first and second pair of said lever arms.

15. The anchor base of claim 14 and means responsive to said articulation for locking said anchor base into a captured position.

* * * * *

UNITED STATES PATENT AND TRADEMARK OFFICE
CERTIFICATE OF CORRECTION

PATENT NO. : 4,143,577
DATED : March 13, 1979
INVENTOR(S) : Robert M. Eberhardt

It is certified that error appears in the above-identified patent and that said Letters Patent are hereby corrected as shown below:

Col. 4, Line 44, "enought" s/b --enough--

Col. 6, Line 8, insert --comprising a cam surface-- between "means" and "formed"

Signed and Sealed this

Twelfth Day of June 1979

[SEAL]

Attest:

RUTH C. MASON
Attesting Officer

DONALD W. BANNER
Commissioner of Patents and Trademarks